US008876009B2

(12) United States Patent
Skoine et al.

(10) Patent No.: US 8,876,009 B2
(45) Date of Patent: *Nov. 4, 2014

(54) TAMPER SENSITIVE RFID TAG

(71) Applicant: Everlast Climbing Industries, Inc., Mendota Heights, MN (US)

(72) Inventors: Mark Skoine, Minneapolis, MN (US); Hans Steege, Minneapolis, MN (US); Joel Greenblatt, Minneapolis, MN (US)

(73) Assignee: Everlast Climbing Industries, Inc., Chattanooga, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/633,296

(22) Filed: Oct. 2, 2012

(65) Prior Publication Data

US 2013/0200160 A1 Aug. 8, 2013

Related U.S. Application Data

(63) Continuation of application No. 12/652,122, filed on Jan. 5, 2010, now Pat. No. 8,282,011.

(51) Int. Cl.
*G06K 19/06* (2006.01)
*G06K 19/077* (2006.01)

(52) U.S. Cl.
CPC ...... *G06K 19/0776* (2013.01); *G06K 19/07758* (2013.01)
USPC .......................................... 235/492; 235/487

(58) Field of Classification Search
USPC .............................. 235/492, 487, 380, 472.02
See application file for complete search history.

(56) References Cited

U.S. PATENT DOCUMENTS

| | | | | |
|---|---|---|---|---|
| 7,898,439 | B2 * | 3/2011 | Bettez et al. .................. | 340/999 |
| 8,272,491 | B2 * | 9/2012 | Khairallah et al. ........... | 194/211 |
| 8,282,011 | B1 * | 10/2012 | Skoine et al. ................. | 235/492 |
| 2009/0283320 | A1 * | 11/2009 | Twitchell et al. ............. | 174/560 |
| 2010/0259392 | A1 * | 10/2010 | Chamandy et al. ......... | 340/572.8 |
| 2010/0327710 | A1 * | 12/2010 | Kolton et al. ............... | 312/223.1 |

FOREIGN PATENT DOCUMENTS

JP 2012245977 * 12/2012 ............... B62J 99/00

* cited by examiner

*Primary Examiner* — Daniel St Cyr
(74) *Attorney, Agent, or Firm* — McAndrews, Held & Malloy, Ltd.

(57) ABSTRACT

A tamper sensitive RFID tag includes a housing defining a channel that is configured to receive a portion of an object associated with the RFID tag. Included with the tamper sensitive RFID tag is a tamper sensitive RFID label that is adhesively secured to a first portion of the housing, and a second securement means for securing the RFID label to a second portion of the housing in a position between the first and second portions.

18 Claims, 3 Drawing Sheets

TAMPER SENSITIVE RFID TAG

FIELD OF THE INVENTION

The present invention relates to tamper-sensitive radio frequency identification (RFID) tags generally, and more particularly to a tamper-resistant RFID tag securable to, for example, a spoked wheel of a bicycle.

BACKGROUND OF THE INVENTION

Radio frequency identification (RFID) technology has become a widespread mechanism for asset tracking and inventory applications. Radio frequency electromagnetic signals are utilized to communicate with an individual electronic product code (EPC) in the circuitry of the RFID tag to identify such tag, and particularly, the object to which such RFID tag is secured. Typically, the RFID tag, which includes an electronic circuit and a coil wire antennae, is embedded in a substrate such as plastic or glass. Preferably, the RFID tag substrate is a material of relatively low electrical conductivity so as to minimize interference with electromagnetic signal transmission to and from the RFID tag. Example RFID applications include supply chain automation, asset tracking, livestock tracking, medical applications, and sports timing. In many applications, RFID technology is utilized to identify and track particular objects, as the associated RFID tags communicate a unique identification that may be correlated with a particular object or object category.

An issue that has arisen in the use of RFID tags for such applications is the security of the association between an RFID tag and its designated respective object. For example, separation of the RFID tag from the associated object can nullify the advantages inherent to RFID technology. Moreover, transplantation of an RFID tag from one asset to another can disrupt and compromise data sanctity obtained from such RFID tag. Consequently, efforts have been made to prevent tampering to RFID tags, and particularly to prevent the transplantation of an RFID tag from a designated asset to a different object. Anti-tampering solutions have focused primarily upon physical attributes of the RFID tag and the corresponding substrate, so as to prevent undesired separation of the RFID tag from the associated asset.

Another mechanism which has been developed to inhibit successful tampering with RFID tags is a technology to alter or disable the circuitry of the RFID tag if attempts are made to separate the RFID tag from the associated asset. In some cases, such solutions utilize RFID tag substrates as an adhesive label with a plurality of distinct pressure sensitive adhesives, each having distinct bond strengths. Attempts to remove the RFID label therefore result in a portion of the label being separated from the remainder of the label, thereby disabling the functionality of the RFID tag.

Recently, legislation has been enacted to enable employers to give employees who commute by bicycle a monthly tax-free stipend. Employers may therefore reimburse employees tax free for bicycle commuting. In addition, health insurance reimbursement opportunities and other organizational programs are available to encourage non-motor vehicle commuting. However, verification of compliance with non-motor vehicle commuter incentive programs has traditionally been a challenge, particularly for larger organizations. Consequently, the proliferation of bicycle commuting incentive programs has been subdued. A need has therefore arisen to provide a system and method for tracking participation in non-motor vehicle commuting incentive programs, and particularly a need to efficiently track non-motor vehicle commuting patterns and determination of participant compliance with program award thresholds.

In one aspect of this need, tracking of bicycles has become central to alternative commuting programs. RFID technology appears to be a logical fit for tracking bicycle commuting activity. To be most effective, RFID tags utilized in such an arrangement should be tamper-resistant, so that the tracking of the RFID tag is consistent with bicycle commuting activity. Thus, it is important that any RFID tags used in such a program remain affixed to the bicycle when in an operational capacity.

While currently available RFID tags may physically be secured to bicycles, certain problems arise in their operation. For example, the relatively large mass of metal in bicycle frames can have the tendency to interfere with RFID signals. Moreover, conventional RFID tags are not typically securable to, for example, a bicycle in a tamper sensitive configuration without tools.

It is therefore an object of the present invention to provide a tamper-sensitive RFID tag that is securable to an object in a manner which minimizes RFID signal interference.

It is another object of the present invention to provide a tamper sensitive RFID tag that is securable to, for example, a bicycle without tools.

SUMMARY OF THE INVENTION

By means of the present invention, RFID tracking of objects, such as bicycles, may be accomplished in an efficient manner through the use of tamper-sensitive RFID tags that are securable to the object without tools. The tamper sensitive RFID tags of the present invention may be secured about a portion of the associated object for tracking purposes. In the event that tampering efforts are made to the RFID tag, forces are transmitted to a tamper sensitive RFID label to effectuate the functional disabling or modifying of the RFID label.

In one embodiment, a tamper sensitive RFID tag of the present invention includes a housing having a first portion and a second portion, and defining at least one channel extending through the housing, with the channel being configured to receive a portion of an associated object. The RFID tag further includes a tamper sensitive RFID label adhesively secured to the first portion of the housing, and a second adhesive for securing the RFID label to the second portion of the housing in a position between the first and second portions. In one embodiment, the associated object is a spoked wheel.

A tamper sensitive RFID tag for securement to a spoked wheel includes a first member having first and second generally opposed surfaces, and a second member having upper and lower edges, and defining at least one channel extending between the upper edge and the lower edge, with the channel being configured to operably receive a spoke of the spoked wheel. The tamper sensitive RFID tag further includes a tamper sensitive RFID label adhesively secured to the first surface of the first member, and a second adhesive for securing the RFID label between the first and second members.

A method for securing a tamper sensitive RFID tag to an associated object includes providing an RFID tag with first and second members defining a channel and a tamper sensitive RFID label having first and second opposed sides, the first side being adhesively secured to the first member. A second adhesive in the RFID tag is secured to the second side of the tamper sensitive RFID label. A portion of the object is positioned in the channel and the second member is secured to the second adhesive to enclose the portion of the object between the first and second members.

DETAILED DESCRIPTION OF THE PREFERRED EMBODIMENTS

The objects and advantages enumerated above together with objects, features, and advances represented by the present invention will now be presented in terms of detailed embodiments which are intended to be representative of various possible embodiments of the invention. Other embodiments and aspects of the invention are recognized as being within the grasp of those having ordinary skill in the art.

For the purposes of this application, the term "tamper sensitive RFID tag" shall mean an RFID device which is designed, configured, and/or implemented to be in some way associated with an object, and to be functionally modified or destroyed upon physical or chemical dissociation from the object. In one embodiment, the tamper sensitive RFID tag is one that is functionally modified or disabled upon physical detachment from the respective associated object.

For the purposes of this application, the term "spoke" shall mean the structurally supportive elements connecting a wheel rim to a wheel hub.

Figure 1:
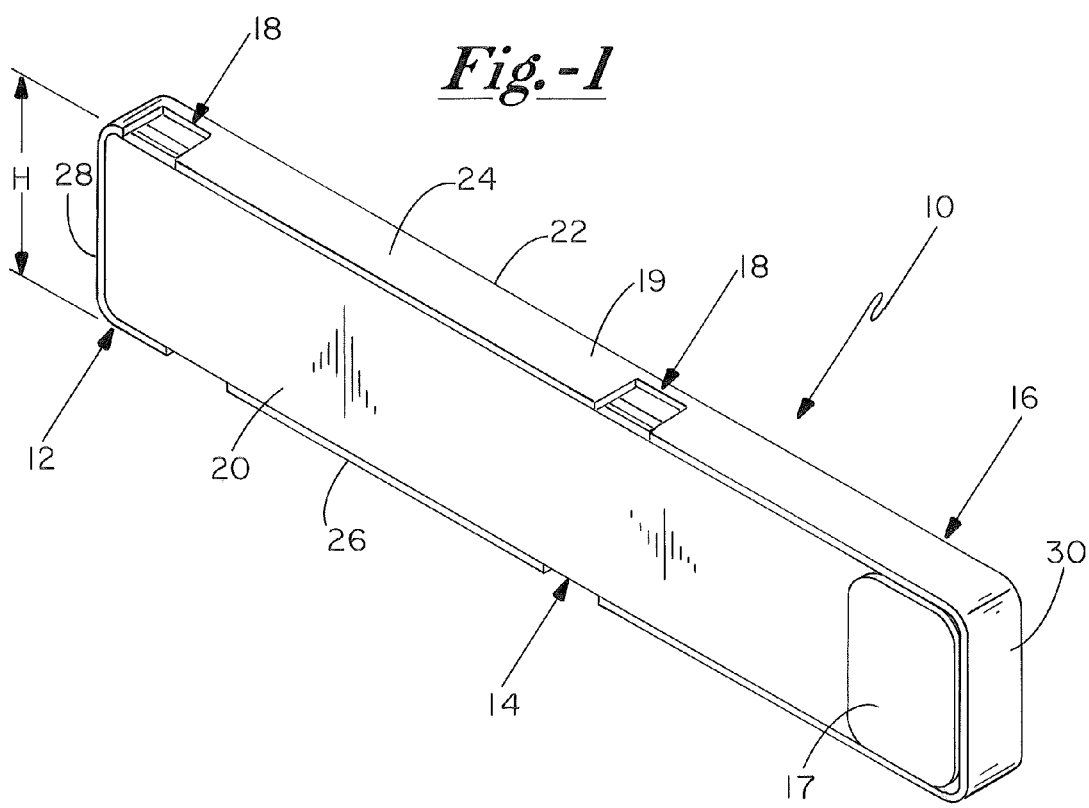
FIG. 1 is a perspective view of a tamper sensitive RFID tag of the present invention.
Figure 2:
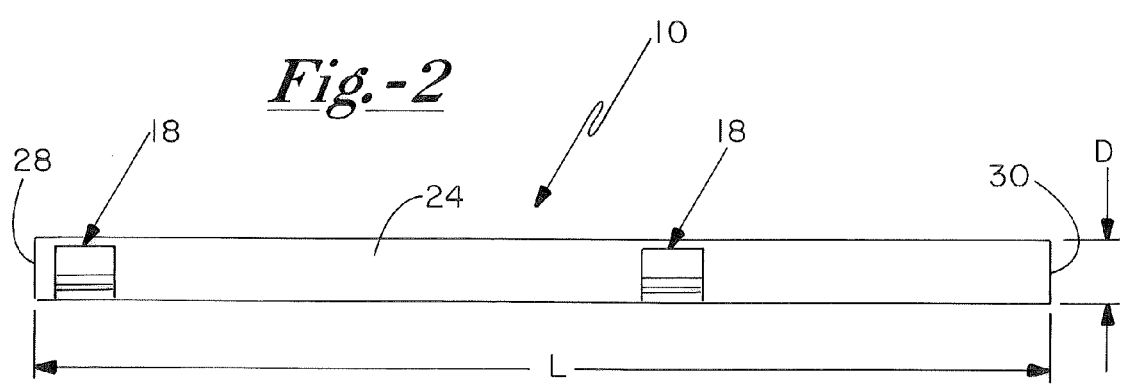
FIG. 2 is a top plan view of the tamper sensitive RFID tag illustrated in FIG. 1.

With reference now to the drawing figures, and first to FIG. 1, a tamper-sensitive RFID tag 10 that is particularly configured for securement to a spoked wheel is shown. RFID tag 10 includes a housing 12 with a first portion 14 and a second portion 16, with housing 12 defining channels 18 extending through housing 12. In the illustrated embodiment, housing 12 has a first side 20 and a second side 22 separated by upper and lower edges 24, 26 and first and second end edges 28, 30. As shown in FIGS. 1 and 2, channels 18 extend through housing 12 from upper edge 24 to lower edge 26. The illustrated embodiment of channel 18, therefore, is specifically configured to define cavities to receive therein a respective spoke of a spoked wheel.

In the illustrated embodiment, channels 18 are positioned at RFID tag 10 in a manner to assist in the tamper sensitivity of RFID tag 10. For example, at least one channel 18 may be positioned near a center area 19 of housing 12 so that attempted separation of first and second portions 14, 16 from one another causes an object, such as a spoke of a spoked wheel, within channel 18 at center area 19 to facilitate damage to housing 12. Accordingly, channels 18 may be positioned and oriented to not only accommodate a portion of an associated object, but to also assist in the tamper sensitivity of RFID tag 10.

Figure 3:
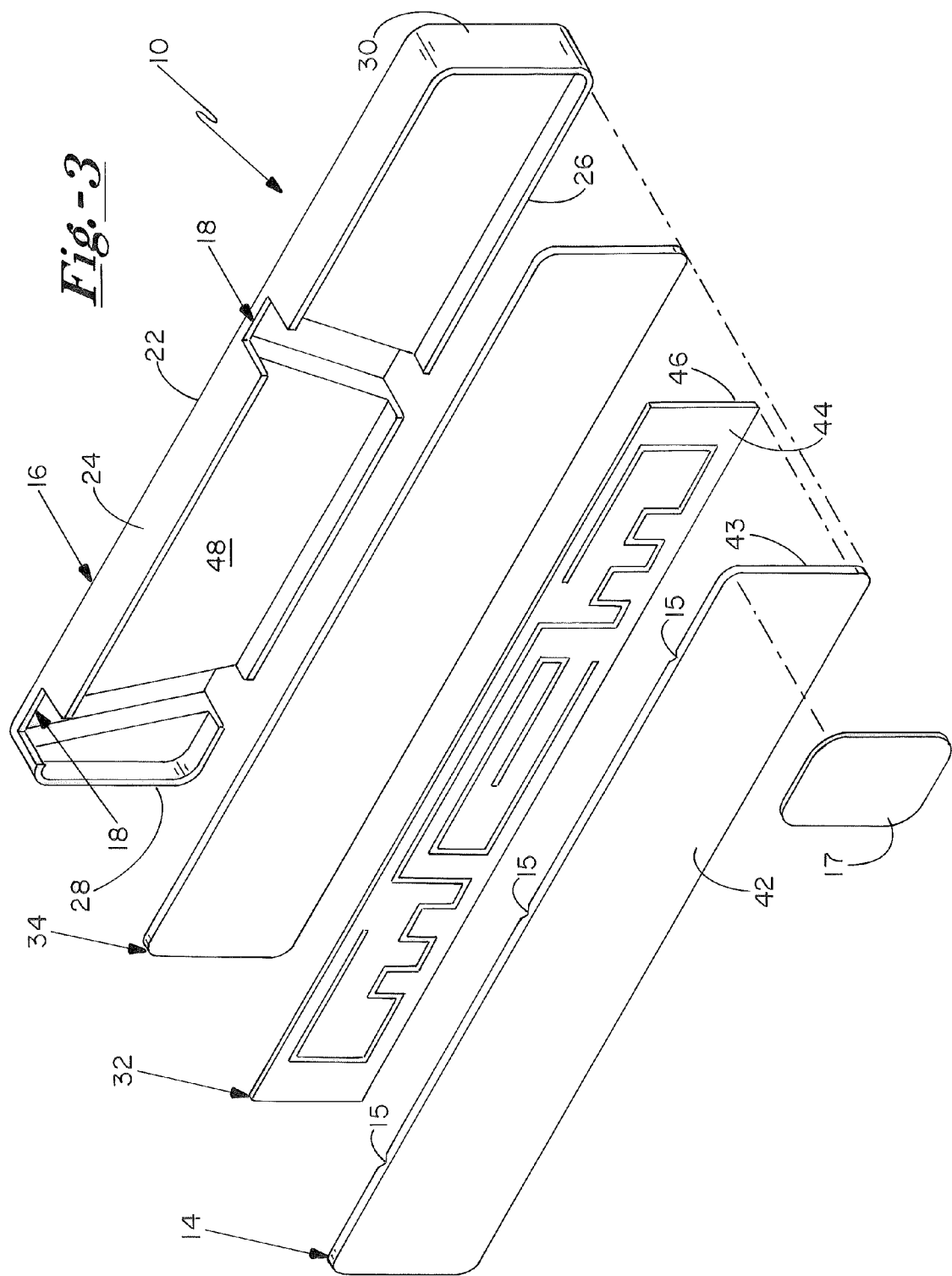
FIG. 3 is an exploded diagram of the tamper sensitive RFID tag illustrated in FIGS. 1 and 2.

An exploded view of the embodiment illustrated in FIGS. 1 and 2 is provided in FIG. 3. As illustrated therein, first and second portions 14, 16 may define distinct members that are engagable with one another. In one embodiment, first portion 14 may be received within second portion 16, such as within the perimeter boundary defined by upper and lower edges 24, 26 and first and second end edges 28, 30. Such edges extend from second side 22 of second portion 16 to thereby define a recess into which, for example, first portion 14, tamper-sensitive RFID label 32, and second adhesive 34 may be operably positioned.

Though RFID tag 10 is illustrated in the drawings as assuming a substantial rectangular configuration, it is contemplated that any of a variety of configurations may be utilized for RFID tag 10. One factor in determining the configuration of RFID tag 10 may be the physical limitations presented in securing RFID tag 10 to a spoked wheel of, for example, a bicycle. In one embodiment of the invention, RFID tag 10 secures about a portion of at least one spoke of the spoked wheel, though other embodiments may operably secure to a plurality of spokes or other structure in the wheel. It is still further contemplated by the present invention that RFID tag 10 may be securable about structure other than a wheel spoke, with channels 18 being configurational into compliance with any desired structure. Accordingly, RFID tag 10, while described herein as being specifically securable to one or more spokes of a spoked wheel, may instead or alternatively be securable to other structure, including, for example, a wheel hub, bicycle framing, bicycle handlebars, bicycle seat posts, pedal cranks, and other structure, both associated and not associated with a bicycle.

First and second portions 14, 16 may be fabricated from a moldable material, such as various plastics. Other materials, however, may be useful in the manufacture of first and second portions 14, 16. In one aspect, first and second portions 14, 16 may be fabricated from relatively low electrical conductivity materials so as to minimize potential interference with RFID signals. In the illustrated embodiment, housing 12 may have an example configuration with a length "L" of between about 2-15 cm, a height "H" of between about 0.25-2.5 cm, and a depth "D" of between about 0.1-1.0 cm. Channels 18 may have a depth of about 2 mm and a width of about 6 mm, and may be angularly oriented in order to accommodate reception of, for example, adjacent spokes in a spoked wheel which are substantially radially arranged about a wheel hub. Channels 18 of the illustrated embodiment may be specifically arranged to accommodate adjacent spokes in a spoked wheel at a range of radial positions out from the hub of the wheel.

First portion 14 may have a press or snap-fit engagement with second portion 16. In the illustrated embodiment, first portion 14 may fit within the perimeter defined by upper and lower edges 24, 26 and first and second end edges 28, 30 of second portion 16. Such a perimeter may further include a lip (not shown) which acts to engage first surface 42 of first portion 14 when first portion 14 is engaged with second portion 16. First and second portions 14, 16 of housing 12 may variously engage or not engage with one another in an operational arrangement. Further, a variety of engagement configurations and mechanisms between first and second portions 14, 16 are contemplated as being within the scope of the present invention. An aspect of the present invention involves an at least partial enclosure about tamper sensitive RFID label 32, which enclosure is adapted to operably enclose about a designated target structure on the asset to be protected. Therefore, housing 12 may include one or more distinct parts that are configured to operably establish a connection to a target structure, wherein tamper sensitive RFID label 32 is at least partially enclosed by the housing.

First portion 14 may further include one or more scores 15 in second surface 43. Scores 15 aid in causing damage to first portion 14 in the event that efforts are made to separate first portion 14 from second portion 16 when RFID tag is in an operational arrangement. By facilitating damage to first portion 14, scores 15 enhance the tamper sensitivity of RFID tag 10. In the illustrated embodiment, a plurality of scores 15 are provided at second surface 43 of first portion 14 as channels or recesses therein. Scores 15 reduce the cross-sectional thickness of first portion 14, thereby weakening first portion 14 at the areas of scores 15 to promote breakage of first portion 14 in the event of physical tampering to RFID tag 10.

In some embodiments, a sticker 17 may be applied to RFID tag 10, such as at first portion 14, with such sticker 17 indicating the serial number of RFID label 32. Consequently, a user or administrator of a system utilizing RFID tag 10 may readily ascertain the identification of the particular RFID tag 10 through the information contained at sticker 17.

As illustrated in FIG. 3, RFID tag 10 further includes a tamper-sensitive RFID label 32 that may be adhesively secured to first portion 14. As described above, various RFID labels are commercially available, and applicants believe that a variety of RFID labels may be useful in the constructions of the present invention. In one embodiment, RFID label 32 includes RFID circuitry and a coil antennae embedded within a substrate, at least a first surface of which bears one or more pressure sensitive adhesives. In the illustrated embodiment, first surface 44 of RFID label 32 is adhesively secured to second surface 43 of first portion 14. To aid in effective adhesive securement of RFID label 32 to second surface 43 of first portion 14, second surface 43 may be receptive to adhesive securement. For example, second surface 43 may, in some embodiments, be substantially smooth in order to facilitate substantial bond strength between at least portions of RFID label 32 and first portion 14. In other embodiments, surface preparations may be applied to or performed upon second surface 43 of first portion 13 to enhance the adhesive bonding between RFID label 32 and first portion 14.

An example tamper-sensitive RFID label suitable for the present invention is available from Mikoh Corporation of Mclean, Va. under the tradename RSI-674. Suitable tamper-sensitive RFID labels include Mikoh Corporation's "Smart and Secure Inform Tags" which disable the RFID functionality of the labels if tampering occurs. Such labels utilize an adhesive chemistry and multi-layer adhesive manufacturing process which results in reliable tamper indication involving antennae damage when the label is compromised or removed from the surface to which it is mounted. In one aspect, the adhesive securement of RFID label 32 to first portion 14 is of a character that an attempt to remove RFID label 32 from first portion 14 disables the RFID functionality of RFID label 32. In some embodiments, while the RFID functionality of label 32 is disabled upon tampering, information may remain retrievable from the circuitry of RFID label 32.

As further shown in FIG. 3, a second adhesive 34 may be provided in RFID tag 10 to secure RFID label 32 to second portion 16. In one embodiment, second adhesive 34 may be a double-sided pressure sensitive adhesive that is adhesively securable to both second side 46 of RFID label 32 and inner surface 48 of second portion 16. In this manner, second adhesive 34 acts to secure RFID label 32 in RFID tag 10 in a position between first and second portions 14, 16.

A particular aspect of the present invention is the formation of a device which is securable to and/or at least partially about a target object in a design which maintains the tamper sensitivity of RFID label 32. Applicants have discovered that second adhesive 34, for example, can establish an adhesive bond between RFID label 32 and second portion 16 that is sufficient to form a closure which, when opened, creates a tampering force upon RFID label 32 that disables its functionality. For example, a first bond strength formed between RFID label 32 and first portion 14 by a first pressure sensitive adhesive at first surface 44 of RFID label 32 is less than a second bond strength that is formed between RFID label 32 and second adhesive 34. In addition, such first bond strength may also be less than a third bond strength formed between send adhesive 34 and second portion 16. Consequently, efforts to separate first portion 14 from second portion 16 in an attempt to remove RFID tag 10 from the associated asset causes the same effect upon RFID label 32 as if efforts were directly made to remove RFID label 32 from first portion 14 in the absence of second portion 16 and second adhesive 34. Due to the superior bond strength as among second adhesive 34, second portion 16, and RFID label 32, compared to the bond strength between a portion of RFID label 32 and first portion 14, separation of first portion 14 from second portion 16 of an assembled RFID tag 10 causes a portion of RFID label 32 to remain adhered to second adhesive 34, while another portion of RFID label 32 remains adhesively secured to first portion 14, thereby disabling the RFID functionality of label 32.

In view of the above, therefore, one aspect of the present invention is a blend of adhesive bond strengths as among first portion 14, RFID label 32, second adhesive 34, and second portion 16. In one embodiment, such relative bond strengths facilitate disablement of RFID functionality of label 32 upon separation of first and second portions 14, 16 of RFID tag 10. Moreover, separation first and second portions 14, 16 would be required in order to remove RFID tag 10 from the associated asset, such as the bicycle wheel, due to the configuration of the present invention in the securement of housing 12 at least partially about the associated asset to be tracked through the RFID system. Applicants have found that a pressure-sensitive double-sided adhesive available from 3M Company of Saint Paul, Minn. under the tradename VHB 4952 is useful in the applications described above. Other adhesives, materials, or mechanisms may also or instead by utilized to perform the securement of second adhesive 34, as described above.

Figure 4:
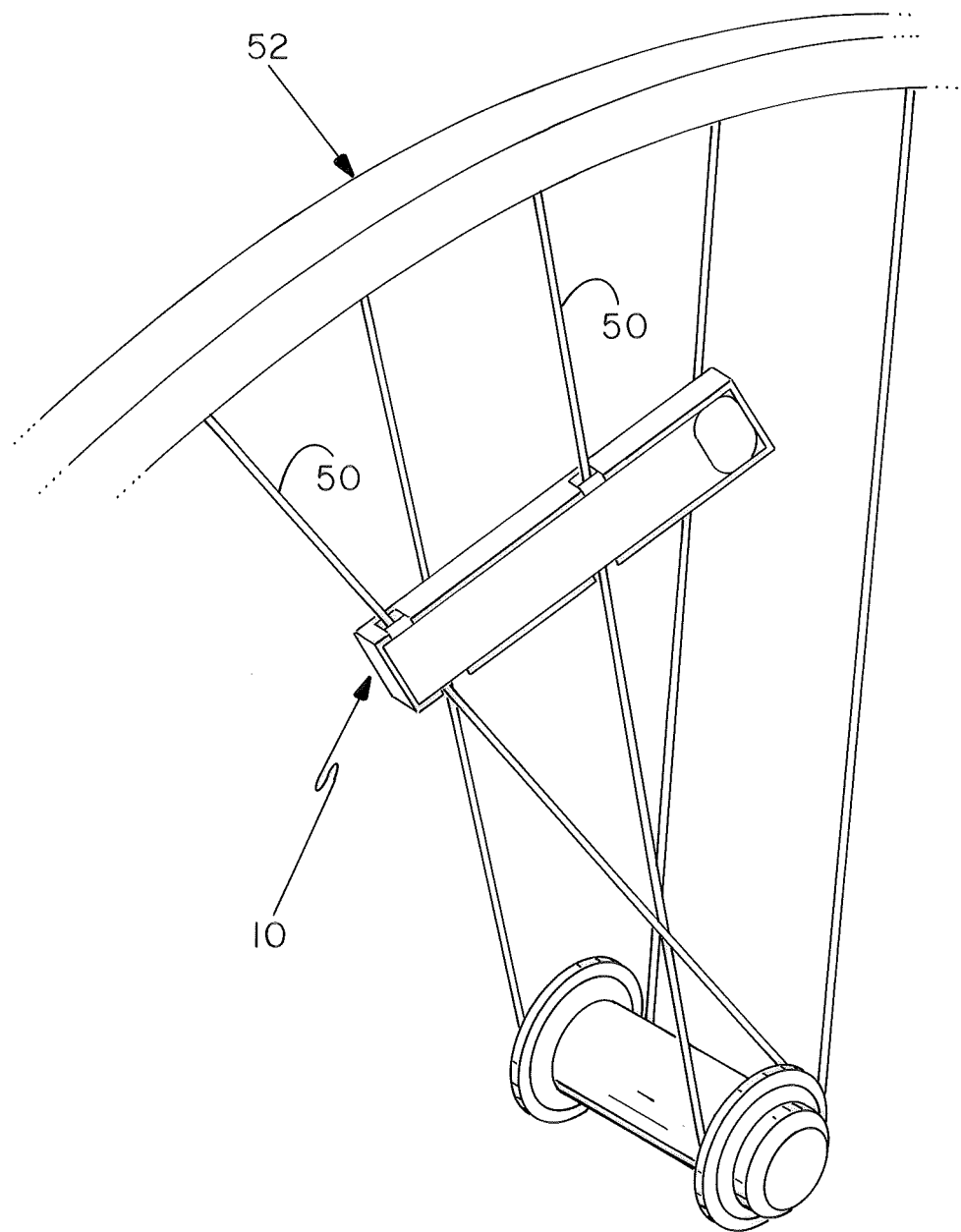
FIG. 4 is a schematic illustration of the tamper sensitive RFID tag of FIGS. 1-3 in operation.

An example application of RFID tag 10 of the present invention is illustrated in FIG. 4, wherein RFID tag 10 is secured to and about portions of spokes 50 of bicycle wheel 52. In this application, a method for securing RFID tag 10 to a bicycle includes positioning one or more spokes 50 of spoked wheel 52 in channels 18 of housing 12. Once spokes 50 are so positioned, second member 16 is secured to second adhesive 34 to enclose a portion of the spokes 50 between first and second members 14, 16 of RFID tag 10. First and second members 14, 16 may further be engaged with one another to secure RFID tag 10 in place, and to further establish the tamper-sensitive arrangement.

In one aspect of the present invention, it has been discovered that securement of RFID tag 10 to spokes 50 minimizes interference to RFID signals that may be caused by relatively large and proximate masses of electrically conductive material. For example, the relatively high void volume in the spoke area of wheel 52 minimizes interference effects as compared to certain other locations of a bicycle, like the frame. Moreover, it has been determined that the performance of RFID tag 10 in receiving and transmitting signals may be somewhat sensitive to the orientation of RFID tag 10. Accordingly, Applicant has discovered that mounting of RFID tag 10 in the spoke area of wheel 52 orients RFID tag 10 to accommodate signal transmission to and from RFID tag 10. It is to be understood, however, that the RFID tag of the present invention may assume a variety of configurations, and may be operably securable to a variety of objects, specifically including various portions of a bicycle or other vehicles or objects.

In some embodiments, RFID tag 10 may include a reflective material disposed at one or more outer surfaces of housing 12. In this manner, RFID tag 10 may further function as a light reflector securable to, for example, a bicycle wheel. In addition, Applicants contemplate a variety of additional utilities for RFID tag 10, which may be in addition to the RFID functionality described herein.

The invention has been described herein in considerable detail in order to comply with the patent statutes, and to provide those skilled in the art with the information needed to apply the novel principles and to construct and use the invention as required. However, it is to be understood that the invention may be carried out by different devices, and that various modifications may be accomplished without departing from the scope of the invention itself.

What is claimed is:

1. A tamper resistant RFID tag for securement to an associated object, said RFID tag comprising:
   a. a housing having a first portion and a second portion, wherein the housing defines at least one channel extending through the housing;
   b. said channel configured to receive a portion of an object to which the RFID tag is secured; and
   c. an RFID device affixed between the first portion and the second portion of the housing, wherein the RFID device is affixed to the first portion of the housing using a first adhesive having a first bond strength and the RFID device is affixed to the second portion of the housing using a second adhesive having a second bond strength, and wherein the first bond strength is different from the second bond strength.

2. The RFID tag as in claim 1, wherein the second bond strength is greater than the first bond strength.

3. The RFID tag as in claim 1, wherein said object is a spoke of a bicycle wheel.

4. The RFID tag as in claim 1, further including an informational notice on at least one outer surface of the housing providing identification of the RFID device therein.

5. The RFID tag as in claim 1, wherein the RFID device and housing are configured such that separating the first and second portions of the housing destroys a functionality of the RFID device.

6. The RFID tag as claimed in claim 5, wherein separation of the first and second portions of the housing causes a first portion of the RFID device to remain adhered to the first portion of the housing and a second portion of the RFID device to remain adhered to the second portion of the housing.

7. The RFID tag as claimed in claim 5, wherein separation of the first and second portions of the housing is required in order to remove the RFID tag from the associated object.

8. The RFID tag as in claim 1, wherein at least one of the first and second portions of the housing includes at least one score that facilitates damage to the housing when the first and second portions of the housing are separated.

9. The RFID tag as in claim 1, wherein the housing includes a reflector on at least one outer surface of the housing.

10. The RFID tag as in claim 1, wherein the RFID tag is securable to the object without tools.

11. The RFID tag as in claim 1, wherein the first portion of the housing has a press-fit engagement or a snap-fit engagement with the second portion of the housing.

12. The RFID tag as in claim 1, wherein the channel extends between an upper edge and a lower edge of the housing.

13. The RFID tag as in claim 1, further comprising at least two channels, the at least two channels being configured to accommodate adjacent spokes of a bicycle wheel.

14. An RFID tag for securement to a bicycle, said RFID tag comprising:
   a. a housing having first and second portions;
   b. a channel through the housing that is configured to receive at least a portion of the bicycle;
   c. an RFID device;
   d. the housing encapsulating at least a portion of the RFID device;
   e. the RFID tag being configured to be attached to the bicycle in such a way that removing the RFID tag from the portion of the bicycle causes the RFID device to stop functioning;
   wherein removing the RFID tag from the portion of the bicycle requires separation of the first and second portions of the housing, and separation of the first and second portions of the housing causes the RFID device to stop functioning.

15. The RFID tag as in claim 14, wherein the RFID tag is securable to the bicycle without tools.

16. The RFID tag as in claim 14, wherein the RFID tag is securable to the bicycle using adhesives.

17. The RFID tag as in claim 14, wherein the housing is configured to encompass the portion of the bicycle in the channel of the housing.

18. The RFID tag as in claim 14, wherein the portion of the bicycle is a spoke of a bicycle wheel.

* * * * *